(12) United States Patent
Lee

(10) Patent No.: US 6,378,815 B1
(45) Date of Patent: Apr. 30, 2002

(54) MOUNTING ASSEMBLY FOR MOTOR VEHICLES

(76) Inventor: Michael Lee, 13533 Lake Luntz Dr., Winter Garden, FL (US) 34787

( * ) Notice: Subject to any disclaimer, the term of this patent is extended or adjusted under 35 U.S.C. 154(b) by 0 days.

(21) Appl. No.: 09/469,018

(22) Filed: Dec. 13, 1999

(51) Int. Cl.[7] .................. F16L 3/00; B62J 7/06
(52) U.S. Cl. ................ 248/121; 248/125.8; 248/178.1; 224/420
(58) Field of Search ............... 248/121, 125.8, 248/159, 176.3, 178.1, 185.1, 205.2; 180/219; 280/288.4, 279; 224/413, 420, 453, 452

(56) References Cited

U.S. PATENT DOCUMENTS

| | | | | |
|---|---|---|---|---|
| 3,556,557 A | * | 1/1971 | Blair III | 280/279 |
| 4,329,076 A | * | 5/1982 | Coreth | 403/109 |
| 4,436,350 A | | 3/1984 | Jolin | |
| 4,445,228 A | | 4/1984 | Bruni | |
| 4,750,658 A | * | 6/1988 | Jennings | 224/275 |
| 4,981,243 A | | 1/1991 | Rogowski | |
| 5,005,661 A | | 4/1991 | Taylor et al. | |
| D325,679 S | * | 4/1992 | O'Mealy et al. | D6/429 |
| 5,114,060 A | | 5/1992 | Boyer | |
| 5,154,381 A | * | 10/1992 | Malinao | 248/178 |
| 5,154,391 A | * | 10/1992 | Hegarty | 248/454 |
| 5,390,656 A | * | 2/1995 | Villa et al. | 124/89 |
| 5,470,090 A | * | 11/1995 | Stewart et al. | 280/276 |
| 5,564,665 A | * | 10/1996 | Resnick | 248/519 |
| 5,615,620 A | * | 4/1997 | Owen | 108/45 |
| 5,669,370 A | * | 9/1997 | Breedlove | 124/89 |
| 5,690,307 A | * | 11/1997 | Joyce | 248/274.1 |
| 5,911,395 A | | 6/1999 | Hussaini | |
| 5,911,523 A | * | 6/1999 | Burchart | 40/406 |
| 5,954,208 A | * | 9/1999 | Schultz | 211/13.1 |
| 5,992,805 A | * | 11/1999 | Tanner | 248/161 |

* cited by examiner

Primary Examiner—Anita King
Assistant Examiner—Naschica S Morrison
(74) Attorney, Agent, or Firm—Robert L. Wolter, Esq.; Beusse Brownlee; Bowdoin & Wolter, PA

(57) ABSTRACT

The mounting assembly includes a shaft having a planar member mounted on a top end of the shaft. The planar member is preferably mounted so it pivots with respect to the shaft. The shaft is insertable in a hollow cylinder on a motor vehicle. In the case of a motorcycle, a portion of the shaft is inserted in a steering stem of a steeing head. A plurality of o-rings, attached to a portion of the shaft inserted in the cylinder, secure the mounting assembly in place. A Velcro™ piece, fixed to a top surface of the planar member, clasps to a corresponding Velcro™ piece of an electronic device placed on the mounting assembly.

19 Claims, 5 Drawing Sheets

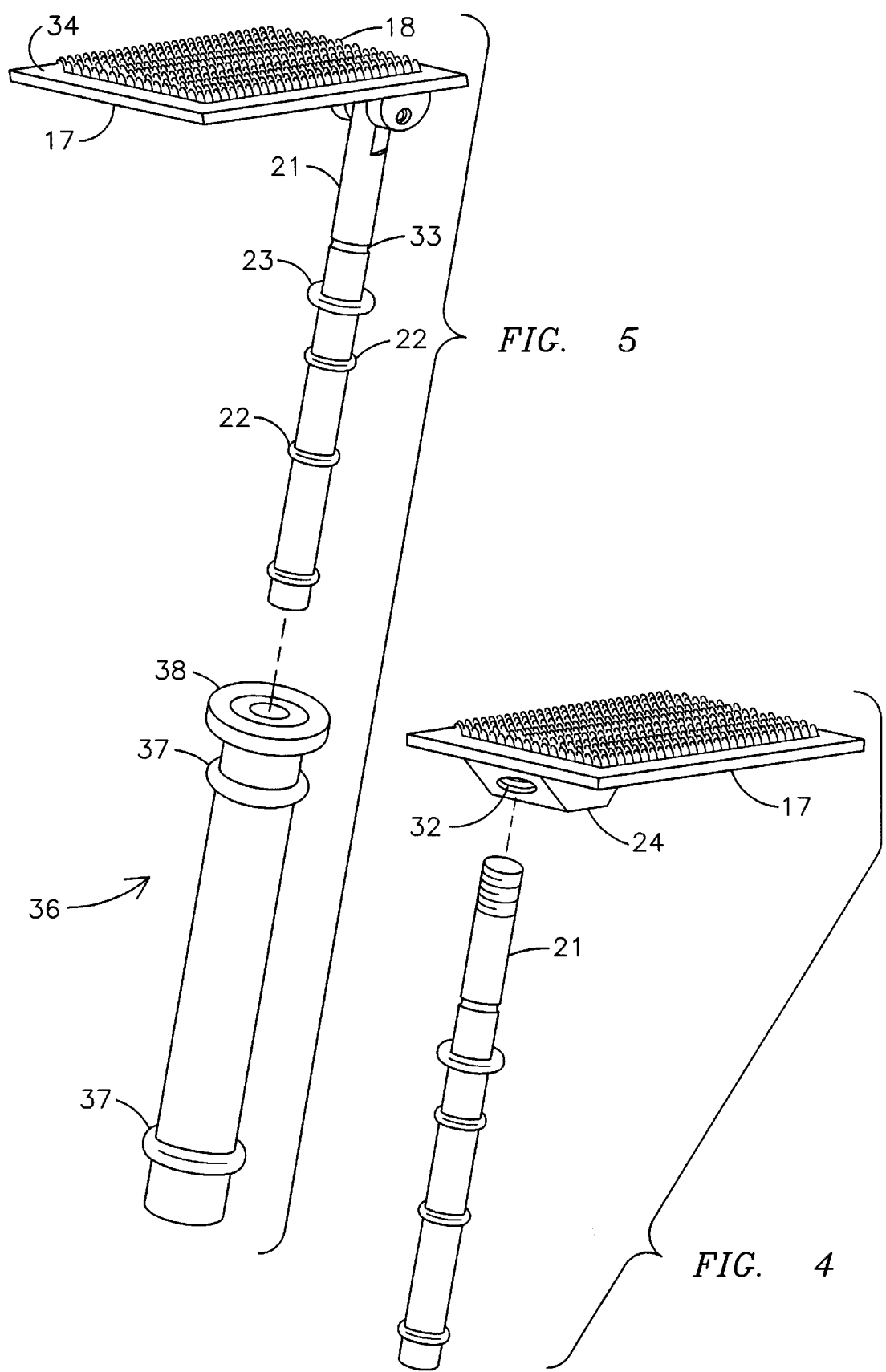

MOUNTING ASSEMBLY FOR MOTOR VEHICLES

FIELD OF THE INVENTION

The field of this invention relates generally to mounting assemblies used to mount accessory devices on motor vehicles. More specifically, it relates to mounting assemblies used for motorcycles, and in particular for mounting radar detection devices on motorcycles.

BACKGROUND

Motorcycles continue to grow in popularity throughout the United States and the world. In particular, people drive motorcycles for recreation such as touring or cruising as a substitute for automobile transportation. Motorcycle enthusiasts cruise highways often prefer to use radar detection devices, and other small electronics as cellular telephones or global positioning satellite devices. Unfortunately the sport and sport-touring motorcycles incorporate a steering head that restricts the space available for mounting such devices on the motorcycle.

SUMMARY OF THE INVENTION

Accordingly, it is an object of this invention to provide a mounting assembly adapted to be used with existing motorcycle steering heads and other motor vehicles with similar arrangements. Another object of this invention is to provide such an assembly that can be easily inserted or removed from a motorcycle steering head or similar arrangements in other motor vehicles. Yet another object of this invention is to provide a mounting assembly that is inexpensive and has a relatively simple construction.

The mounting assembly includes a shaft having a planar member mounted on a top end of the shaft. The planar member is preferably mounted so it pivots with respect to the shaft. The shaft is insertable in a hollow cylinder on a motor vehicle, In the case of a motorcycle, a portion of the shaft is inserted in a steering stem of a steering head. A plurality of o-rings, attached to a portion of the shaft inserted in the cylinder, secure the mounting assembly in place. A Velcro™ piece, fixed to a top surface of the planar member, clasps to a corresponding Velcro™ piece of an electronic device placed on the mounting assembly.

An adapter is also used to secure the mounting assembly in steering stems having larger diameters. The adapter may be a cylinder secured in the steering stem with o-rings similar to the shaft of the mounting assembly. A rim is disposed along, and integral with, a top end of the adapter and engages a top edge of the steering stem to prevent the adapter from following through the steering stem.

BRIEF DESCRIPTION OF THE DRAWINGS

FIG. 4 is a side view of a second embodiment of the mounting assembly.

FIG. 5 is a perspective view of third embodiment of the invention.

DETAILED DESCRIPTION OF THE DRAWINGS

Figure 1:
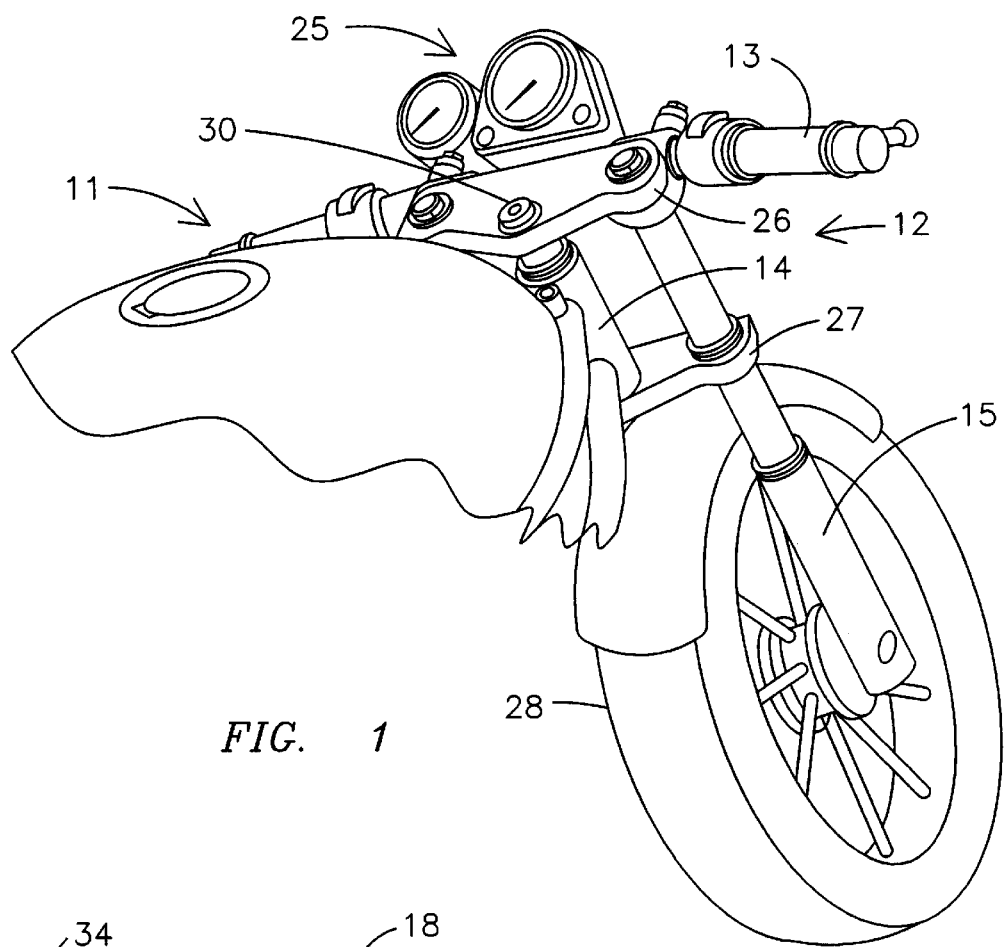
FIG. 1 is a perspective view of a steering head of a motorcycle.

Many designs of motorcycles 11 known as sport and/or sport touring motorcycles include a steering head 12 as illustrated in FIG. 1. The steering head 12 includes an upper triple clamp 26 and a lower triple clamp 27. The triple clamps 26 and 27 operationally link together two steering forks 15 to the front wheel 28. Handle poles 13 are mounted to the upper triple clamp 26. A hollow cylinder referred to as a steering stem 14 connects the upper triple clamp 26 to the lower triple clamp 27. On many motorcycles the top 30 of the steering stem 14 remains open. On other models manufacturers may cover the steering stem 14 with some type of cover such as a cap threaded on the top of the steering stem 14.

Figure 2:
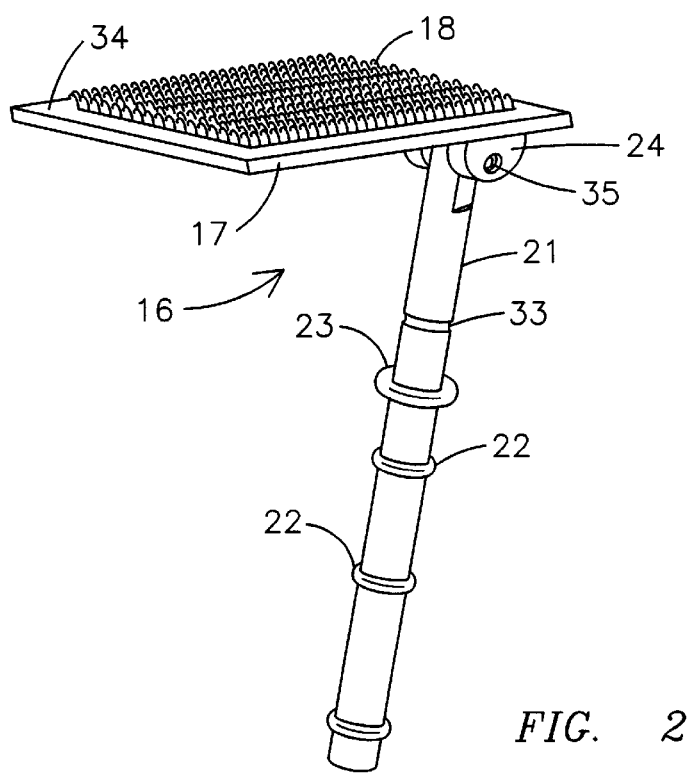
FIG. 2 is a perspective view of the mounting assembly.

The mounting assembly 16 is generally'shown in FIG. 2. The mounting assembly 16 includes a planar member 17 mounted to a shaft 21. As shown in FIG. 2, the planar member 17 is mounted at an acute angle with respect to the shaft 17. The steering stem 14 extends parallel to the steering forks 15 and extends at an angle less than perpendicular from horizontal. Accordingly, the planar member 17 and shaft 21 are mounted at such an angle with respect to one another such that the mounting planar member 17 is disposed in a substantially horizontal plane when the shaft 21 is inserted in the steering stem 14.

The planar member 17 and shaft 21 may be mounted in a fixed relationship to one another. As shown in FIG. 4, a mounting block 24 is secured to a bottom surface of the plate 17. In addition, the shaft 21 is mounted to the mounting block 24 and extends downward therefrom at an acute angle with respect to the planar member 17. The shaft 21 may have a threaded end 16 fitted in mating relationship to a threaded aperture 32 on the mounting block 24. The planar member 17 is fixed to the block 24 by an adhesive. All parts of the mounting assembly 16 are preferably constructed of aluminum.

In an alternative embodiment shown in FIGS. 2 and 5, the planar member 17 is pivotal with respect to the shaft 21. The mounting block 24 has a groove 36 within which a top end of the planar member 17 fits. A pin 35 extends through the block 24 and shaft 21 so the shaft 21 rotates on the pin 35. Accordingly, the planar member 17 pivots with respect to the shaft 21. In this manner, the planar member 17 is adjusted to a desired pitch for operation of the radar detector, or for viewing of a cellular phone or global positioning device.

With respect to FIGS. 2 and 5, a means for securing the mounting assembly 16 in the steering stem 14 is shown. Such securing means includes a plurality of o-rings 22 disposed along a portion of the shaft 21 insertable within the steering stem 14. The o-rings 22 also space the shaft 21 from an interior surface of the steering stem 14. Thus, the o-rings 22 isolate the shaft 21 from in the steering stem 14, in order to avoid a metal to metal contact. The o-rings 22 absorb any vibrations and maintain the mounting assembly 16 in a stable position within steering stem 14.

In addition a top o-ring 23 is attached to the shaft 21 above the plurality of o-rings 22. This top o-ring 23 has a larger diameter than the plurality of o-rings 22 and serves as a stop when the shaft 21 is inserted within the cylinder 14. The top o-ring 23 abuts a top edge of the stem 14, preventing the shaft 21 from dropping into the stem 14. The top o-ring 23 and plurality of o-rings 22 are similarly attached to the stem 21. Specifically, channels 33 are machined onto the stem and extend annularly around the stem. The o-rings 22 and 23 are seated within the channels 33.

The mounting assembly 16 is universal in the sense that it is designed to fit different models of vehicles with which the mounting assembly is used. The present specification, the vehicle chosen by way of example are motorcycles. Accordingly, the mounting assembly 16 is adaptable for use with different sport and/or sport touring motorcycle models. The instrument panels 25 adjacent in motorcycle steering heads 12 vary in height. Accordingly, a user may have to adjust the height of the vehicle accessory with respect to the instrument panel 25. Taller accessories, such as a camcorder may require a lower adjustment to stabilize such a larger device in the motorcycle.

The shaft 21 on the mounting assembly 16 is preferably seven inches in length; however, the length of that portion of the shaft 21 inserted into the stem 14 is adjustable. As shown in FIGS. 2 and 5, the shaft has a plurality of channels 33 within which the o-rings 22 and 23 seat. Additional channels 33 may be added so the top o-ring 23 can be moved between the channels 33 to adjust the height of the device mounted on the mounting assembly.

Moreover, the inside diameter of the stems 14 may also vary, or change. Presently most sport and/or sport touring motorcycles incorporate stems having an inside diameter of about thirteen millimeters. The outside diameter of the o-rings 22 is generally about 12.75 millimeters, and firmly secure a shaft 21 within the stem 14. The o-rings 22 are interchangeable with larger and smaller o-rings as necessary to fit the stem 14.

Figure 7:
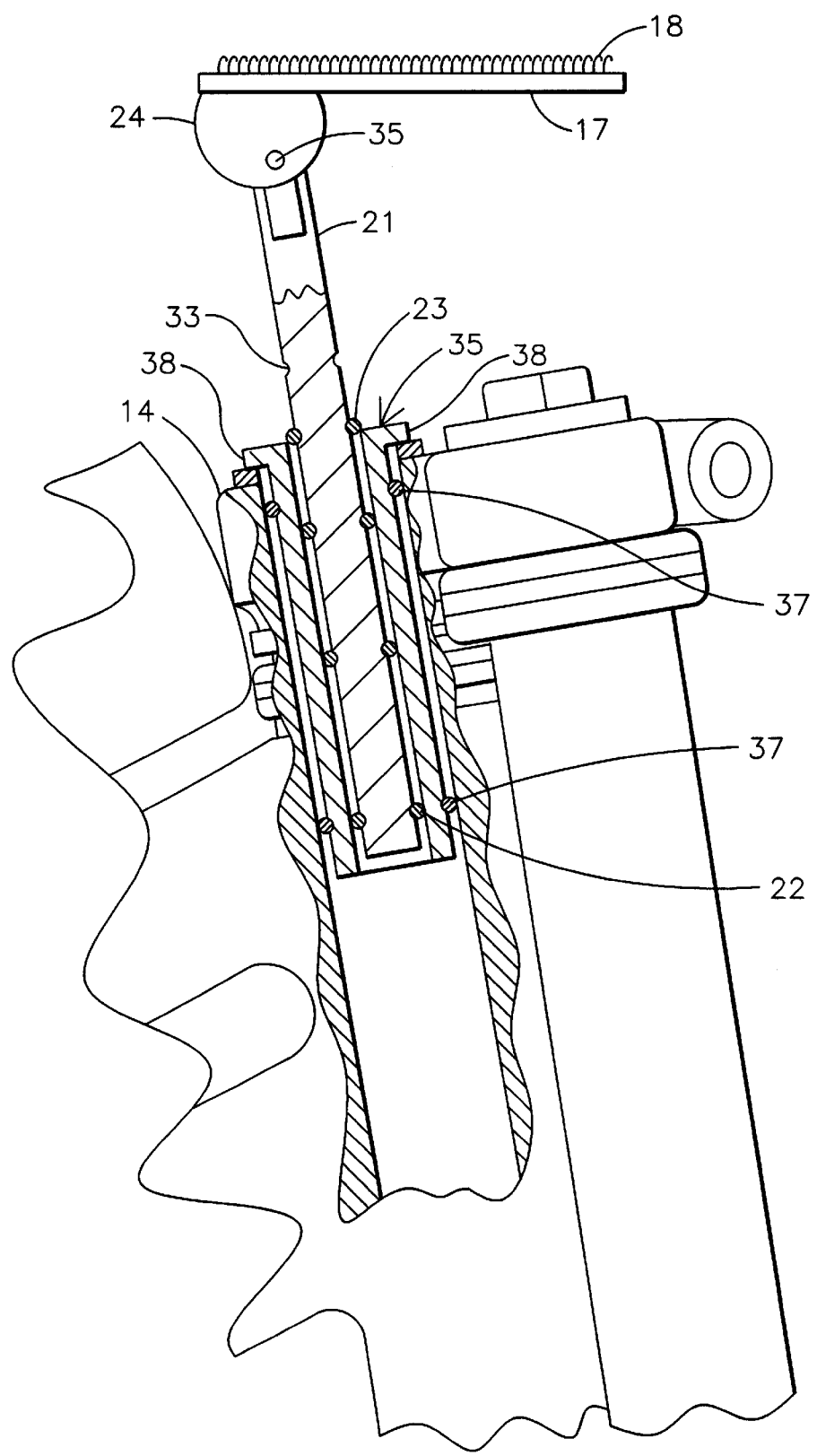
FIG. 7 is a side sectional view of the third embodiment of the mounting assembly on a motorcycle.

For the most part, motorcycle steering stems are close in size. However, other motorcycle steering stems 14 are up to twenty-three millimeters in inside diameter. In such cases, an adapter 36 shown in FIGS. 5 and 7, is cylinder within which the shaft 21 of the mounting assembly 16 fits. The adapter 36 has an upper and lower o-ring 37 that isolate the adapter from the inside surface of the stem 14, and secure the adapter 36 in the stem 14. The adapter 36 also has a rim 38 at the top end of the adapter 36. The rim 38 engages a top edge of the stem 14 to prevent the adapter 36 and mounting assembly from dropping in the stem 14.

Figure 3:
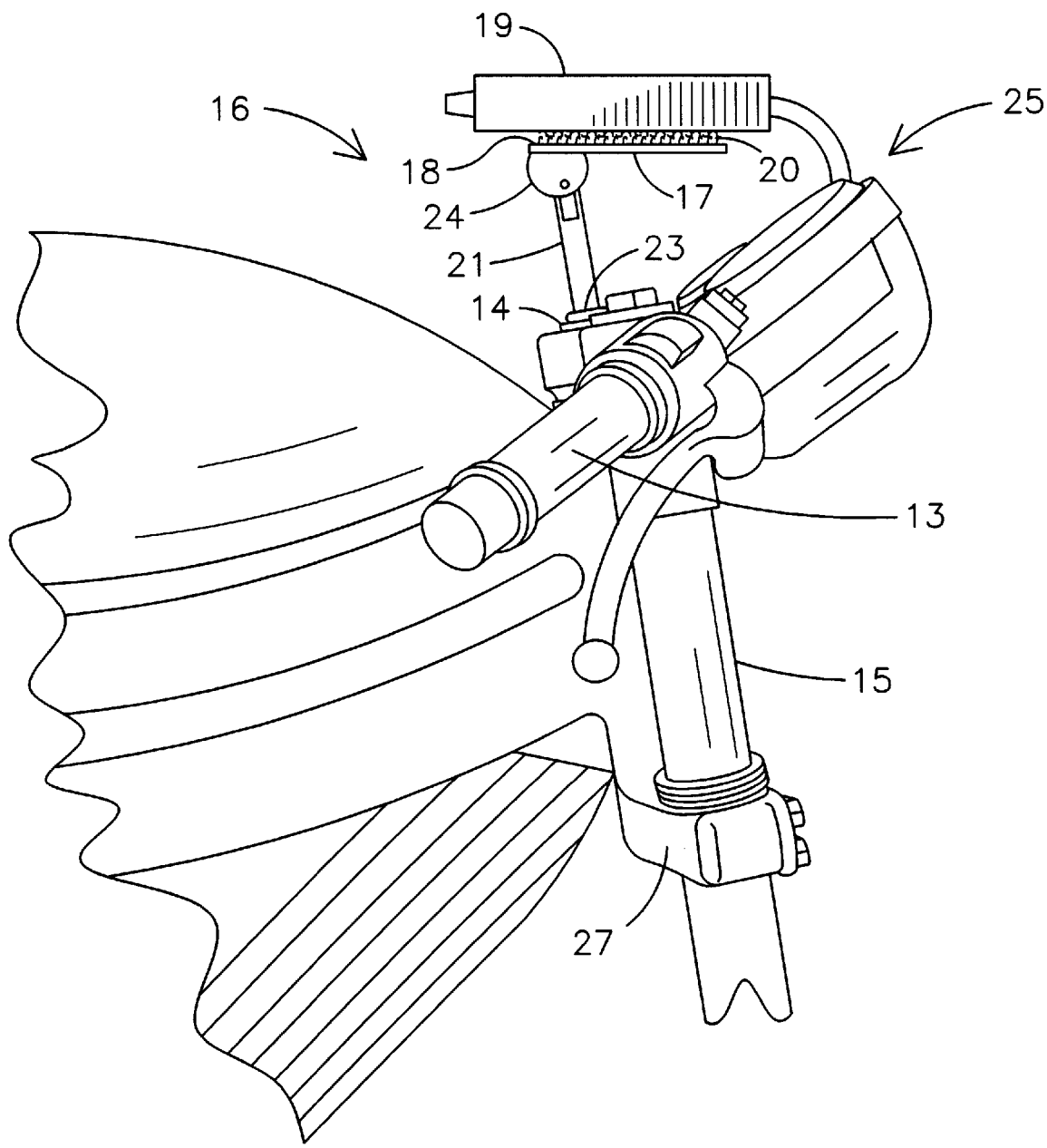
FIG. 3 is a side view of the mounting assembly with a radar detector.
Figure 6:
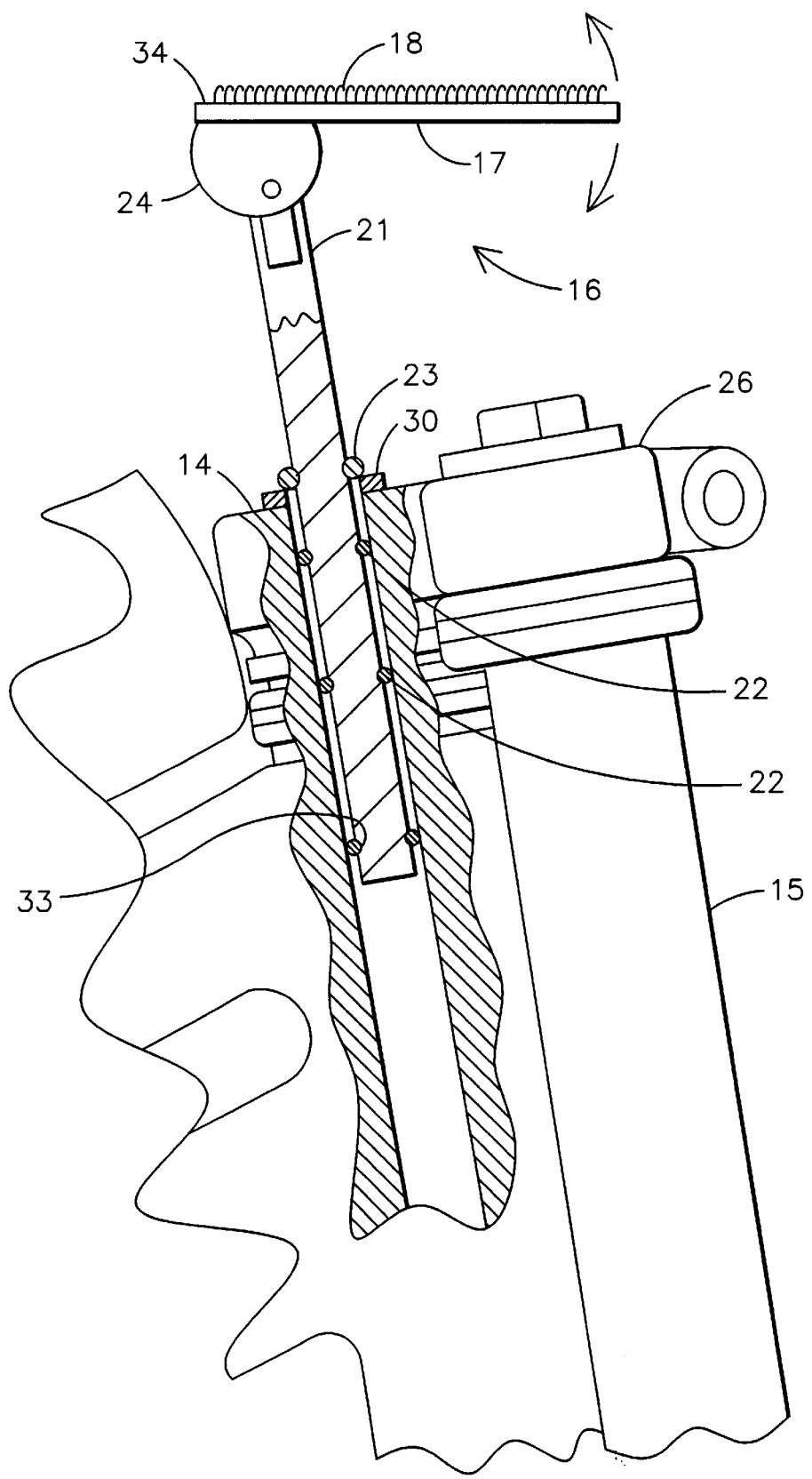
FIG. 6 is a cross sectional view of a motorcycle steering head with a mounting assembly

A Velcro™ sheet 18 is mounted on a top surface 34 of the planar member 17. As shown in FIG. 3, an electronic device such as a radar detector 19 has a corresponding Velcro™ sheet 20 attached to its underside for its attachment to the Velcro™ 18 on planar member 17.

In operation, the shaft 21 of the mounting assembly 16 is inserted into the steering stem 14. The plurality of o-rings 22 are substantially equal to, or slightly larger, than the inside diameter of the cylinder 14 so the o-rings 22 secure the stem 21 within the cylinder 14 stabilize in the mounting assembly 16 on the motorcycle 11. The top o-ring similarly fits within the hollow steering stem 14. Given its larger size the top o-ring 23 prevents the stem from slipping further into the stem 14. The radar detector 19 is attached to the planar member 17 by the Velcro™ sheets 18 and 20. The planar member 17 is disposed in a substantially horizontal position and is at a height sufficient so the radar detector effectively operates. In addition, the planar member 17 is pivoted to a desired pitch for operation of the electronic device.

While the preferred embodiments of the present invention have been shown and described herein in the context of a motorcycle, it will be obvious that such embodiments are provided by way of example only and not of limitation. Numerous variations, changes and substitutions will occur to those of skilled in the art without departing from the invention herein. For example, the present invention need not be limited to motorcycles, since other types of vehicles or other applications can equally benefit from the teachings of the present invention. Accordingly, it is intended that the invention be limited only by the spirit and scope of the appended claims.

What is claimed is:

1. A mounting assembly for mounting accessory devices on a motorcycle, comprising:
   (a) a shaft having a first end inserted within a stem of a steering assembly on a motorcycle;
   (b) a planar member mounted to a second end of the shaft distal said first end of the shaft;
   (c) means, disposed between a portion of the shaft inserted within said stem and an inside surface of the stem, for securing said shaft within the stem; and,
   (d) means, fixed to a top surface of the planar member and to the accessory device, for securing said device on the planar member.

2. A mounting assembly for motorcycle as defined in claim 1 wherein said means for securing the shaft within the stem includes at least one o-ring disposed along the portion of the shaft inserted within the stem.

3. A mounting assembly for a motorcycle as defined in claim 2 wherein said means for securing the stem in the shaft includes a top o-ring being spaced above said at least one o-ring, said top o-ring having an outside diameter greater than an outside diameter of the at least one o-ring.

4. A mounting assembly for a motorcycle as defined in claim 3 wherein said means for securing the shaft within the stem includes a plurality of channels within which the o-rings seat, and said channels are spaced apart on the shaft and extend annularly around the shaft.

5. A mounting assembly as defined in claim 1 further including a mounting block fixed to a bottom surface of the planar member, with the second end of the shaft threaded and secured in mating relationship to a threaded aperture on said mounting block, and said planar member fixed thereon and disposed in an acute angle with respect to said shaft.

6. A mounting assembly as defined in claim 1 wherein said means for securing the accessory device to the planar member includes a first hook and loop fastener fixed to a top surface of the planar member, and a second hook and loop fastener attached to said a bottom surface of the accessory device.

7. A mounting assembly as defined in claim 1 further including means, connecting said planar member to said shaft, for pivoting said planar member and shaft with respect to one another.

8. A mounting assembly as defined in claim 7 wherein said pivoting means includes a mounting block secured to a bottom surface of the planar member, and said block having a groove within which the second end of the shaft fits, and a pin extending through said block and shaft wherein said shaft and block are rotatable on said pin.

9. A mounting assembly as defined in claim 2 wherein said means for securing the stem in the shaft includes an adapter, inserted within the stem, for securing the mounting assembly in larger diameter stems.

10. A mounting assembly as defined in claim 9 wherein said adapter is a cylinder having thereon at least one o-ring disposed between an inside surface of the stem and the cylinder, and a rim integral with a top end of the cylinder and said rim for engagement with a top edge of the stem.

11. A mounting assembly for a mounting an accessory device on a motorcycle, comprising:
   (a) a shaft having a first end inserted within a stem of a steering head on a motorcycle;

(b) a planar member mounted to a second end of the shaft;

(c) a plurality of o-rings disposed on a portion of the shaft inserted within the stem; and, (d) means, fixed to a top surface of the planar member and to a bottom surface of an accessory device, for securing said device on the planar member.

12. A mounting assembly as defined in claim 11 further including a top o-ring spaced above said plurality of o-rings on said shaft and said top o-ring having an outside diameter greater than an outside diameter of the plurality of o-rings.

13. A mounting assembly as defined in claim 12 further including a plurality of channels within which the o-rings seat, and said channels are spaced apart on the shaft and extend annularly around said shaft.

14. A mounting assembly as defined in claim 11 further including mounting block fixed to a bottom surface of the planar member, said shaft having a second end threaded and secured in mating relationship to a threaded aperture on said mounting block, and said planar member fixed thereon and disposed in an acute angle with respect to said shaft.

15. A mounting assembly as defined in claim 11 wherein said means for securing the accessory device to the planar member includes a first hook and loop fastener fixed to a top surface of the planar member, and a second hook and loop fastener attached to said accessory device.

16. A mounting assembly as defined in claim 11 further including means, connected to said planar member, for pivoting said shaft and planar member with respect to one another.

17. A mounting assembly as defined in claim 16 wherein said pivoting means includes a mounting block secured to a bottom surface of the planar member, and said block having a groove within which said second end of the shaft fits and a pin extending through said mounting block and said shaft.

18. A mounting assembly as defined in claim 11 further including an adapter, inserted within the stem, for securing the mounting assembly in larger diameter stems.

19. A mounting assembly as defined in claim 18 wherein said adapter is a cylinder having thereon at least one o-ring disposed between an inside surface of the stem and the cylinder, and a rim integral with a top end of the cylinder and said rim for engagement with a top edge of the stem.

* * * * *